United States Patent Office 3,103,741
Patented Sept. 17, 1963

3,103,741
MATERIALS FOR AND METHOD OF BONDING
Alvin J. Stoeckert, Cedar Grove, N.J., assignor to Radio
Corporation of America, a corporation of Delaware
No Drawing. Filed Oct. 20, 1959, Ser. No. 847,453
5 Claims. (Cl. 29—472.5)

This invention relates to improved methods of bonding metal articles and insulating articles.

In many applications, such as the enclosures for vacuum tubes and the cases for semiconductor devices, it is desirable to fabricate a hermetically sealed structure which is sufficiently rugged to withstand adverse environmental conditions such as high temperature, high humidity, and high accelerations. The case, or enclosure, cannot be made completely of metal, since portions of these structures must be electrically insulating. Composite structures or assemblages have therefore been developed for this purpose consisting of metal parts bonded to insulating parts, which may, for example, be ceramic.

One method of bonding insulating articles to metal articles consists of metallizing the insulating part to produce a metallic film on the surface thereof, and then brazing the aforesaid metallized surface of the insulating part to a metal part, or to another metallized insulating part, in a vacuum or other nonoxidizing environment by means of high temperature brazes. The brazing materials usually consist of alloys of precious metals, and frequently contain either gold or silver. For best results in vacuum brazing, the braze should be a material with a low vapor pressure. Brazes which contain elements with a relatively high vapor pressure, such as silver or indium, are unsatisfactory, since, at the relatively high temperatures and low pressures required for such brazing, they vaporize sufficiently to form undesirable deposits or films on the insulating parts, thus resulting in leakage paths on the insulating portions of the brazed assemblage.

One method that has previously been found satisfactory for bonding metal parts to metallized ceramic parts is to utilize as the brazing material an alloy of gold and nickel containing about 82.5 weight percent gold, balance nickel. This composition has a low vapor pressure and forms satisfactory hermetic seals. However, such brazing compositions have a gold content, and hence a cost, which corresponds to about 20 carat gold. This method is therefore relatively expensive.

Accordingly, a general object of the invention is to provide an improved method of bonding metal articles to insulating articles.

Another object of the invention is to provide an improved method of making a hermetic seal between metal parts and insulating parts.

Another object of the invention is to provide an improved method of bonding metal surfaces and metallized surfaces together.

Still another object is to provide an improved method of making inexpensive ceramic-to-metal seals.

Yet another object is reducing the cost of making brazed seals between metals and metallized insulators.

The foregoing and further objects of the invention are accomplished by utilizing a brazing composition consisting essentially of about 8 to 12 weight percent germanium, balance copper. The brazing step is preferably performed in a vacuum or low ambient pressure from about .001 to 0.1 micron Hg. The workability of brazing compositions according to the invention, which have a relatively high germanium content, such as compositions in the range of about 11 to 12 weight percent germanium, may be improved by adding about 0.1 to 2.0 weight percent of an additive such as nickel, iron, cobalt, ruthenium, rhodium, palladium, osmium, irridium, platinum, titanium, molybdenum, tantalum, tungsten, or the like. This method produces a good hermetic seal and has the advantages of low film formation at undesirable places, since the vapor pressure of this brazing composition is low, and reduced unit cost, since for equal volumes of braze the material cost of this composition is about one-seventieth that of the nickel-gold alloys previously utilized.

Other objects and advantages of the present invention will become apparent from the following detailed description.

Compositions used as a braze should have a melting point lower than the melting point of the articles to be bonded together. The melting point of copper is 1083° C., and the melting point of germanium is 958° C. The phase diagram for the germanium-copper system is fairly complex, and indicates the formation of one eutectic alloy containing about 40 weight percent germanium with a melting point of 640° C., and another eutectic melting at 749° C. containing about 27 weight percent germanium. See Hansen, "Constitution of Binary Alloys," McGraw-Hill, New York, 1958, page 585. According to Hampel, only one compound has been identified between copper and germanium, namely $Cu_3Ge$. It is also stated that alpha-copper will dissolve about 10 weight percent germanium in the solid state. See Rare Metals Handbook, Reinhold, New York, 1954, page 167.

The composition of five suitable brazes in accordance with the invention, and the flow point of each composition is set forth in the following table.

TABLE I

| Braze No. | Composition in Weight Percent | | | Flow Point, ° C. |
| --- | --- | --- | --- | --- |
| | Germanium | Copper | Additive | |
| 1 | 8 | 92 | | 1,050 |
| 2 | 9 | 91 | | 1,030 |
| 3 | 10 | 90 | | 1,010 |
| 4 | 11 | 88.80 | 0.20 Co | 985 |
| 5 | 12 | 87.75 | 0.25 Ni | 965 |

Germanium-copper brazes which contain less than about 8 weight percent germanium have a melting point which is considerably close to that of pure copper, and are not preferred for general use. Germanium-copper brazes which contain about 11 or more weight percent germanium are difficult to work and to draw into fine wires. It has been found that the addition of about 0.1 to 2.0 weight percent of a suitable additive increases the workability of the high germanium compositions without adversely affecting such physical characteristics as flow point and ability to wet various metals and metallized surfaces. Suitable additives for increasing the workability of germanium-copper brazes according to the invention are the transition elements of group VIII of the periodic table, including iron, cobalt, nickel, ruthenium rhodium, palladium, osmium, irridium, and platinum, as well as several metals not in group VIII, namely titanium, tantalum, molybdenum, and tungsten. The additive suppresses the close-packed hexagonal zeta phase present in germanium-copper alloys which contain about 11 to 19 weight percent germanium, and yields compositions which can be drawn into wires as small as 20 mils in diameter. If more than about 2 weight percent of the additive is used, the melting point of the resulting composition is usually not as low as desired. If less than 0.1 weight percent of the additive is used, the resulting compositions are not sufficiently workable.

As explained above, it is desirable that the brazing composition have a low vapor pressure, so as to minimize the deposition of thin films of the braze on the insulating parts. An important advantage of the bonding method of the instant invention is the low vapor pressure of the brazing compositions utilized. This low vapor pressure results from the circumstance that germanium has a vapor pressure considerably lower than that of such common brazing ingredients as indium and silver. In fact, the vapor pressure of germanium is even less than that of gold, which is much more expensive. The vapor pressures at 1000° C. of various braze components are set forth in the following table.

TABLE II

| Element: | Vapor pressure at 1000° C. in mm. Hg |
|---|---|
| Indium | $3 \times 10^{-2}$ |
| Silver | $6 \times 10^{-3}$ |
| Aluminum | $2 \times 10^{-4}$ |
| Copper | $3 \times 10^{-5}$ |
| Gold | $1 \times 10^{-5}$ |
| Germanium | $4 \times 10^{-6}$ |

The insulating material to be bonded may consist of glass, Photoceram, Pyroceram, Ceramicon, quartz, sapphire, or ceramics such as steatite, forsterite, high alumina compositions, and the like.

The metal parts to be bonded may consist of molybdenum, tungsten, tantalum, copper, nickel, and alloys such as steel, stainless steel, nickel-iron alloys, Kovar, Fernico, and the like.

In order to minimize stresses in the brazed assemblage, the two parts to be bonded should have a minimum mismatch in their thermal expansion coefficients. An important advantage of the bonding method of the instant invention is that the germanium-copper alloys utilized as the braze are relatively soft and ductile when properly annealed, and hence tend to reduce the stresses caused by bonding together two articles with dissimilar thermal expansion coefficients.

An example of the method of the invention will now be described, including the annealing of the brazing composition.

Example

An alloy of 12 weight percent germanium, 0.25 weight percent nickel, balance copper, is prepared, for example by placing the ingredients in a crucible. The resulting mixture, which corresponds to braze number five in Table I, is then vacuum-melted and cast in the form of a rod-shaped ingot about 0.5 inch in diameter. Each ingot weighs about 0.5 pound. The ingot is hot swaged at a temperature of about 775° C. to 800° C. until the rod diameter is reduced to about .01 inch. The ingot is now annealed at 800° C. in a hydrogen atmosphere for about 10 to 30 minutes. The ingot is then cooled to room temperature and cold drawn into a wire having a 40 mil diameter. The wire is annealed again at 800° C. in a hydrogen atmosphere for about 10 to 30 minutes. After cooling, the wire is drawn down to a diameter of 20 mils.

In this example, the metal part is a stainless steel cup with a collar at the open end. The steel consists of 17 weight percent chromium and 83 weight percent iron. The insulating part is a ceramic stem in the form of a disc composed of forsterite. The ceramic part is metallized by any convenient method. In this example, the forsterite part is metallized by coating it with a solution of lithium dimolybdate, then firing it in a hydrogen atmosphere so as to form a molybdenum film on the surface of the ceramic.

The stainless steel cup is held with open end up and the metallized forsterite disc is positioned in the collar of the cup. A ring of the previously prepared brazing wire is placed on the forsterite stem so as to contact both the rim of the ceramic part and the interior rim of the cup collar. The assemblage of metal part, insulating part, and brazing wire is now heated to a temperature of about 1000° C. while the furnace is pumped and maintained at an ambient pressure of about .001 to 1 micron Hg. During this step, the wire ring melts and flows around the periphery of the forsterite stem. On cooling, a hermetic seal is formed between the metal cup and the ceramic stem.

There has thus been described an improved method of bonding metal parts to insulating parts. Many variations and modifications may be made in the method without departing from the spirit and scope of the instant invention. For example, instead of bonding a metal part and an insulating part, or bonding two insulating parts, the method of the invention may also be utilized for bonding two metal parts. Instead of brazing the parts in a vacuum, this step may also be performed in a non-oxidizing atmosphere, for example a reducing atmosphere such as hydrogen, or an inert atmosphere such as nitrogen or argon.

What is claimed is:

1. The method of bonding parts composed of materials selected from the group consisting of metals and metallized ceramics, comprising brazing said parts in a non-oxidizing environment with an alloy consisting essentially of about 11 to 12 weight percent germanium, about 0.1 to 2.0 weight percent of a metal selected from the group consisting of iron, cobalt, nickel, ruthenium, rhodium, palladium, osmium, irridium, platinum, molybdenum, tantalum, titanium and tungsten, balance copper.

2. The method of bonding parts composed of a material selected from the group consisting of metals and metallized ceramics, comprising vacuum brazing said parts with an alloy consisting essentially of about 11 to 12 weight percent germanium, about 0.1 to 2.0 weight percent of a metal selected from the group consisting of iron, cobalt, nickel, ruthenium, rhodium, palladium, osmium, irridium, platinum, molybdenum, tantalum, titanium, and tungsten, balance copper.

3. The method of bonding parts composed of a material selected from the group consisting of metals and metallized ceramics, comprising brazing said parts with an alloy consisting essentially of about 11 to 12 weight percent germanium, about 0.1 to 2.0 weight percent of a metal selected from the group consisting of iron, cobalt, nickel, ruthenium, rhodium, palladium, osmium, irridium, platinum, molybdenum, tantalum, titanium, and tungsten, balance copper, said brazing being performed in an ambient pressure of about .001 to 1 micron Hg.

4. An alloy for brazing consisting essentially of about 11 to 12 weight percent germanium, about 0.1 to 2.0 weight percent of an element selected from the group consisting of nickel, iron, cobalt, ruthenium, rhodium, palladium, osmium, irridium, platinum, titanium, molybdenum, tantalum, and tungsten, and balance copper.

5. An alloy for brazing consisting essentially of about 12 weight percent germanium, about 0.25 weight percent nickel, and balance copper.

References Cited in the file of this patent

UNITED STATES PATENTS 2,763,822     Frola et al. _____ Sept. 18, 1956

OTHER REFERENCES

Metals Handbook, 1948 ed., p. 28, published by American Society for Metals, Cleveland, Ohio.